Jan. 24, 1967  R. G. DOERFLING  3,300,357
HEADLINER CONSTRUCTION AND METHOD OF MAKING SAME
Filed Sept. 23, 1964  2 Sheets-Sheet 1
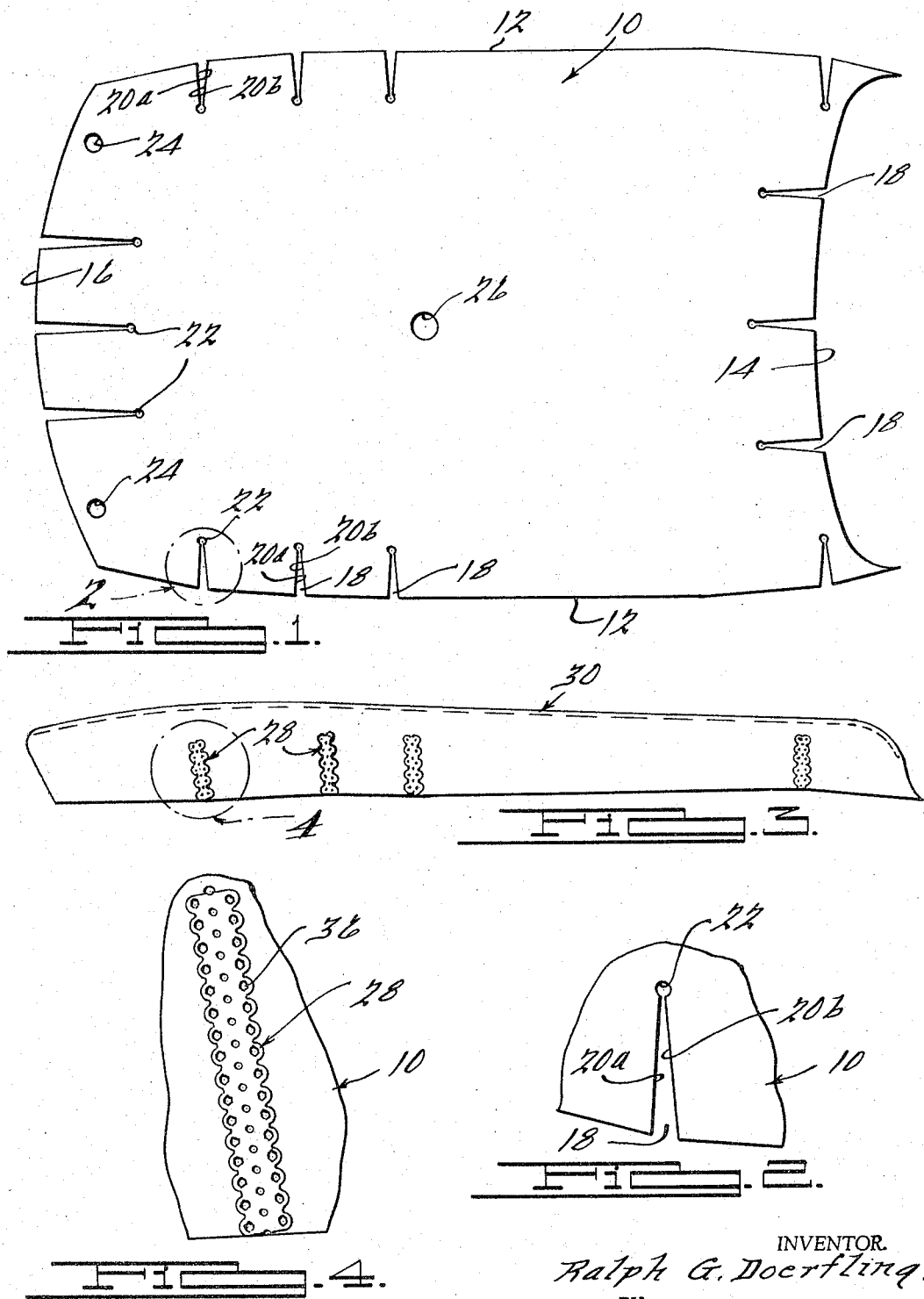
INVENTOR.
Ralph G. Doerfling.
BY
Harness, Dickey & Pierce
ATTORNEYS

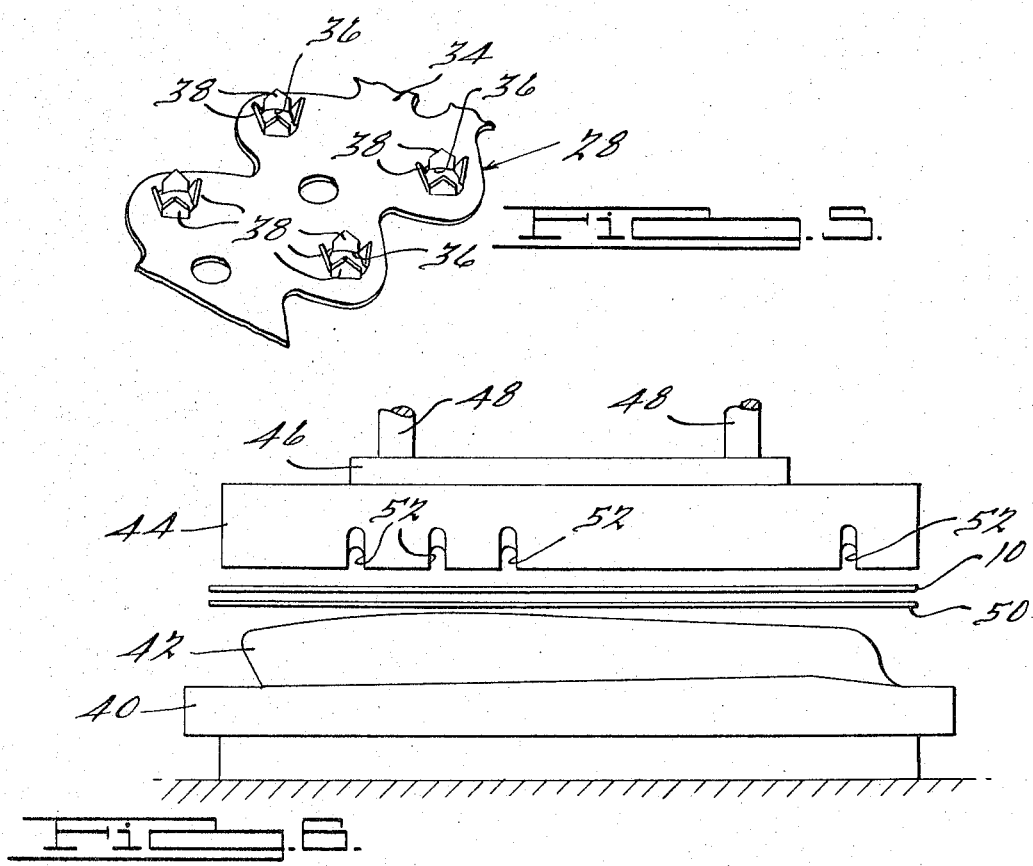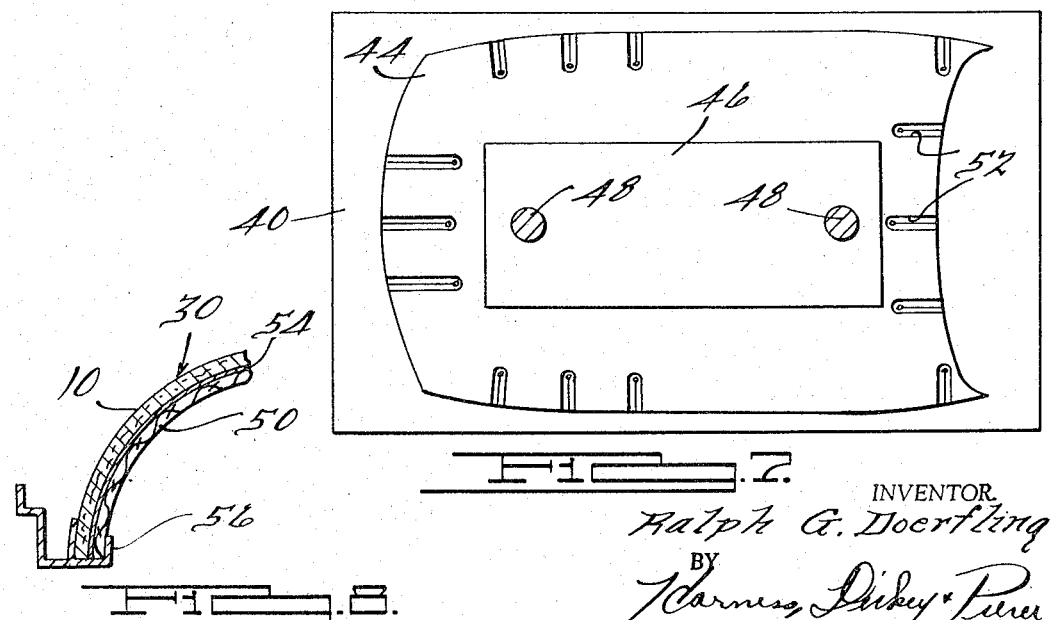

United States Patent Office 3,300,357
Patented Jan. 24, 1967

3,300,357
HEADLINER CONSTRUCTION AND METHOD OF
MAKING SAME
Ralph G. Doerfling, Walled Lake, Mich., assignor to Detroit Gasket and Manufacturing Company, New York, N.Y., a corporation of Delaware
Filed Sept. 23, 1964, Ser. No. 398,583
4 Claims. (Cl. 156—211)

The present invention broadly relates to automobile interior trim panels and more particularly to a novel preformed headliner construction consisting of a prestressed integral contoured panel which may be provided with a suitable decorative surface on the exposed face thereof. The present invention also relates ot a method of forming a preshaped and prestressed headliner construction which is substantially simpler and more economical than the techniques heretofore known.

A continuing problem has been presented in providing an attractive and durable interior headliner for use in automobiles which is not only of low cost and simple manufacture but is also of simple and quick installation. Conventional automobile headliner constructions include a suitable body cloth which is sewn at longitudinally spaced increments to a series of transversely extending listing wires or bows which, on assembly, are fastened to the upper edges of the roof panel and the body cloth is tensioned so as to follow a contour of the roof. Alternatively, various composite headliner constructions comprising a plurality of molded panels have been employed which are positioned beneath the roof panel, and the individual panel sections are connected along their edges by suitable interlocking trim moldings. In either case, great difficulty is encountered in effecting a rapid and accurate installation of the headliners during automobile assembly operations. Additionally, headliners constructions comprising a plurality of assembled panels are less attractive in appearance due to the presence of the numerous trim molding strips required to effect a juncture of the individual sections. Sectionalized headliner constructions of the aforementioned type are subject to the further inherent disadvantage of their relatively low strength and tendency to buckle or become malformed during use as may be occasioned by a slipping or shifting of the interconnecting trim molding. Cloth headliner constructions are also subject to the disadvantage of low strength and low puncture resistance and can be readily torn or ripped as a result of inadvertent contact with sharp objects carried in the automobile.

It is accordingly a principal object of the present invention to provide an improved headliner construction and method of making the headliner which overcomes the problems and disadvantages associated with various headliner constructions of the types heretofore known.

Another object of the present invention is to provide an improved headliner construction which is comprised of an integral resilient panel that is preformed and prestressed, assuring shape retention throughout its long and useful operating life.

Still another object of the present invention is to provide and improved headliner construction comprising a unitary resilient panel which is preformed and prestressed into a preselected contour, providing for increased strength and resistance to deformation by loads imposed thereagainst and providing for increased safety to the occupants of the automobile in the event of an accident.

A further object of the present invention is to provide an improved integral headliner construction consisting of a unitary preshaped and prestressed panel which is sufficiently resilient to enable it to be deformed and snapped into position during installation, forming a firm interlocking connection and substantially simplifying and creasing the speed of assembly.

Still a further object of the present invention is to provide an improved integral headliner construction which can be readily formed at room temperature without employing expensive molding dies and by virtue of which substantially increased flexibility and versatility is achieved in the manufacture of the headliner and in the selection of decorative materials that can be applied on one face of the panel.

Yet still another object of the present invention is to provide a novel headliner construction which is of high strength, of an attractive appearance, of simple installation, of low cost and of excellent durability.

Yet still a further object of the present invention is to provide a method of forming a composite integral headliner construction which provides for increased flexibility and versatility in manufacture, which obviates the need of expensive tooling, which enables the application of a greater variety of facing sheets to the exposed surface of the panel due to the absence of any high temperature conditions during the manufacture thereof, and which is of simple and economical operation and control.

Other objects, features and advantages of the present invention will become apparent from the subsequent description and the appended claims, taken in conjunction with the accompanying drawings, in which:

FIGURE 1 is a plan view of a typical die cut panel prior to deformation into a prescribed configuration;

FIG. 2 is a magnified fragmentary plan view of a portion of the panel as illustrated in FIGURE 1 and disposed within the circle indicated at 2;

FIG. 3 is a side elevational view of a preformed and prestressed headliner panel derived from the panel illustrated in FIGURE 1;

FIG. 4 is an enlarged fragmentary side elevation view of a portion of the headliner shown in FIGURE 3 and disposed within the circle indicated at 4;

FIG. 5 is an enlarged perspective view of a suitable fastening device employed for connecting the side edges of the panel adjacent to the slots incorporated therein;

FIG. 6 is a fragmentary side elevation view partly schematic, illustrating a typical press employed for preshaping and concurrently laminating a die cut panel and a suitable facing sheet into a preselected contour;

FIG. 7 is a plan view of the press arrangement as illustrated in FIGURE 6; and

FIG. 8 is an enlarged fragmentary sectional view taken through one edge of a headliner panel installed adjacent to the roof of an automobile.

Referring now in detail to the drawings, and as may be best seen in FIGURES 1 and 2, the improved headliner comprising the present invention consists of a panel 10 which is die cut to a preselected shape consistent with the desired configuration of the resultant contoured headliner. The panel 10 is comprised of any relatively high-strength resilient material such as composition board, conventional hard board, corrugated waterproof board, laminated kraft paperboard, or the like, which is sufficiently resilient to enable a bending or shaping of the panel from a planar configuration to a suitably contoured configuration without exceeding the yield strength of the material or sustaining any buckling or breaking of the panel. Composition boards of the foregoing types which are suitable for use in accordance with the practice of the present invention are comparatively inexpensive and can be commercially purchased in flat sheets of the desired size, thereby further reducing the cost of headliners made therefrom. The panel 10, as illustrated in FIGURE 1, is formed with a pair of longitudinal arcuate side edges 12 which in the finished headliner are adapted to be disposed along the side edges of the roof panel; a rear edge 14 which is adapted to fit adjacent to the upper edge of the rear window or back light of the vehicle body; and a front edge 16 which is adapted to be secured above the windshield header and interlocked by a suitable trim molding. The specific contour of the side edges 12, rear edge 14, and front edge 16 of the panel 10 will vary in accordance with the particular design and size of the vehicle in which it is to be installed, as well as the specific arcuate curvature or contour of the finished headliner.

A plurality of V-shaped slots or notches 18 are disposed at preselected intervals along the side edges, rear edge and front edge of the panel 10, which extend inwardly toward the central portion of the panel and are provided to enable the panel to be deformed without effecting any buckling of the panel material along the points of maximum contour. The specific location of the V-shaped slots 18, the length of inward extension thereof, and the angularity or gap provided, will vary consistent with the specific contour and the degree of curvature imparted to the panel during the shaping operation. In either event, the V-shaped slots are located such that when the panel 10 is shaped to the appropriate contour, the adjacent side edges defining each slot and indicated at 20a and 20b are disposed in contiguous aligned relationship, forming a continuous uninterrupted contoured surface. In order to further alleviate any stress concentrations that may occur at the apex of each of the V-shaped slots 18, a small circular aperture indicated at 22, as may be best seen in FIGURE 2, is provided which is disposed in comunication with the V-shaped slot facilitating shaping of the panel and formation of a smooth contoured, concave surface.

The entire panel 10 can be die cut in a single operation to the desired size and shape. In addition, the V-shaped slots 18 and the circular apertures 22 at the apex thereof can concurrently be cut into the panel during the die cutting operation. In addition to the foregoing, the cutting die can also be provided with cutters for cutting a pair of circular apertures 24 disposed adjacent to the front edge 16 of the panel as well as an aperture 26 disposed in the central portion thereof for accommodating suitable fixtures in the interior of the automobile. For example, the apertures 24 may be suitably provided for affixing the mounting brackets for the windshield visors while the aperture 26 may accommodate a dome light. Alternative suitable apertures, or cutouts, can be provided, as desired, in accordance with the intended end use of the headliner.

The substantially flat panel 10, as shown in FIGURE 1, is thereafter deformed under stress such as in a suitable press in a manner subsequently to be described, wherein the side edges 20a, 20b of each of the V-shaped slots 18 are disposed in contiguous alignment and abutting relationship and are retained in that position after the bending stress is released by means of suitable fasteners 28 which are secured in overlying relationship over the resulting slit formed between the side edges 20a, 20b. The fasteners 28 serve to retain the side edges 20a, 20b in appropriate aligned relationship in opposition to the residuary stress in the preformed concave headliner 30, thereby maintaining its appropriate contoured configuration. The headliner 30 illustrated in FIGURE 3 corresponds to that obtained when employing a die cut panel 10 of the type illustrated in FIGURE 1.

A fastening device 28 which has been found particularly suitable for the purposes of the present invention comprises a box-type fastener, as best seen in FIGURES 4 and 5, which consists of a thin flat strip of steel 34 which is formed with a plurality of circular apertures 36 extending along each edge thereof which are formed by piercing the steel strip in a manner so as to produce a plurality of engaging tangs 38 extending around and projecting substantially perpendicular from the strip 34. The resultant fastener 34, in effect, comprises an elongated staple and is positioned over the closed V-shaped slots such that each row of the engaging tangs 38 extending along each side of the steel strip 34 are embedded within and secured to the panel material on opposite sides of the resultant slit formed. During the installation of the fastener 32 in the contoured panel, the engaging tangs 38 tend to spread, effecting firm embedment and interlocking in the panel material resisting any tendency of the fastener to separate. The strip 34 is of a sufficiently pliable nature as to readily conform with the contour of the panel along the juncture of the side edges 20a, 20b defining the slits in the deformed panel. The engaging tangs 38 are of a length so as to assure that the ends thereof do not penetrate through to the concave face surface of the headliner to which a suitable facing sheet is preferably secured in a manner to be subsequently described.

While a fastener of the type illustrated in FIGURE 5 is preferred for use in securing the side edges of the panels adjacent to the V-shaped slots when in the preshaped configuration, any one of a variety of alternative suitable fastening devices, including staples as well as high-strength adhesive tapes, can also be satisfactory employed for this purpose. In either event, the fastening device used preferably provides a substantially flush upper surface and avoids any projections on the inner concave face of the resultant headliner panel.

It will be apparent from the foregoing that the concave face surface of the panel will be of an integral uniformly contoured configuration interrupted only by the presence of hairline slits as defined by the side edges 20a, 20b of each of the V-shaped slots initially provided in the panel 10. In order to obscure the presence of these slits and to further enhance the attractiveness of the concave face of the headliner, a suitable facing sheet is secured thereto which may either be of a textured plastic material, a woven material of synthetic or natural fibers, or a spray coating of an adherent material of sufficient body to obscure the slits present on the inner face surface. Conventionally, suitable woven fabric materials such as grass cloth, or the like, which may additionally include metallic fibers for accenting their appearance which are adhesively secured to the inner concave face surface of the panel, have been found particularly suitable for this purpose. Relatively loose woven fabrics of the aforementioned type are sufficiently stretchable so that they can be applied and tenaciously bonded to the concave surface of the panel during the course of the pressing of the panel to the appropriate configuration, effecting thereby concurrent lamination and contouring of the headliner in one step. It is also contemplated, however, that after the panel 10 has been contoured and fastened so as to retain the preselected contour, the inner face surface thereof can be provided with an adhesive coating to which a suitable facing sheet can thereafter be applied. Alternatively, a suitable flocculent material can be sprayed on the adhesive coated concave surface, forming an attractive matted surface.

The simplicity in the design and in the manufacture of the improved preshaped and prestressed headliner comprising the present invention will become more apparent with reference to FIGURES 6 and 7, illustrating a typical press employed for contouring and concurrently laminating a panel and facing sheet. In the exemplary arrangement shown, the press comprises a base 40 on the upper surface of which a male mold 42 of the appropriate contour is affixed and is disposed in vertical registry with a corresponding female mold 44 affixed to the under side of a movable press platen 46 supported by rods 48. The male mold 42 and corresponding female mold 44 can conveniently be fabricated from synthetic plastics in lieu of the substantially more expensive metal dies heretofore required in molding sheet materials under high temperature and pressure. Plastic dies are particularly suitable for the method comprising the present invention inasmuch as no elevated temperature is required to effect any curing of the materials nor are the loads imposed of a magnitude requiring the high strength inherent in the more expensive metal mold constructions. The substantially lower cost of the plastic dies is particularly important in view of the necessity of employing a series of matched male and female molds of different contours corresponding to the variety of different model designs within a particular make of automobile.

In accordance with the arrangement as illustrated in FIGURE 6, the prestressed and preshaped headliner can be fabricated in one operation by positioning an appropriate die cut panel 10 of the type as illustrated in FIGURE 1 beneath the female mold 44 and in appropriate registry therewith. A suitable facing sheet 50 is disposed below the panel 10. The underside of the panel 10 is provided with an adhesive coating thereon for tenaciously securing the facing sheet to the concave face surface of the panel. In the relationship as shown in FIGURE 6, the movable platen 46 is lowered, whereupon the facing sheet 50 and the die cut panel 10 are contoured in conformance with the configuration of the male mold 42 and female mold 44 and are retained in that position during which time suitable fasteners such as the fasteners 28 are affixed in overlying relationship on the convex face surface of the panel and over the slits formed by the closed V-shaped slots. In order to facilitate the attachment of the fasteners while the panel and facing sheet are retained under stress in the mold, the female mold 44 is provided with a series of grooves 52 adjacent to the periphery thereof which are adapted to register with the V-shaped slots such as the slots 18 in the panel as illustrated in FIGURE 1. The grooves 52 along the edges of the female die 44 are of a size sufficient to enable simple installation of the fasteners while the panel is retained in the contoured configuration. After all of the fastening devices have been installed, the upper movable platen 46 is raised and the fasteners retain the panel in the contoured configuration and in opposition to the residuary stresses in the panel, tending to return it to a substantially planar configuration. The resultant headliner with the facing sheet securely adhered to the inner concave surface thereof is in a prestressed condition, enhancing its strength and its resistance to deformation by impacts imposed thereon when installed in a vehicle body.

It will be apparent from the foregoing that the headliner when removed from the press is in a substantially finished condition, necessitating only a trimming of the facing material along the side edges, front and rear edges of the panel. The resultant headliner is further characterized in the smooth uninterrupted continuity of its concave inner face incorporating the facing sheet thereon, substantially enhancing the appearance of the interior of the automobile. The trimmed edges of the headliner require no further processing other than the trimming of the facing sheet.

The integral headliner can be simply snap fastened within the interior of an automobile body such that the edges are engaged by suitable garnish moldings extending around the roof panel header, as best illustrated in FIGURE 8. As is fragmentarily illustrated in FIGURE 8, the headliner 30 comprising the contoured panel 10 having the facing sheet 50 adhesively secured to the inner concave surface thereof by an adhesive layer 54 is appropriately retained along one of its edges by means of a U-shaped clip or molding 56, which engages and overlies a portion of the concave surface adjacent to the edges thereof.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. The method of making an integral prestressed and preshaped vehicle headliner which comprises the steps of providing a substantially flat panel of a resilient material, cutting said panel to a preselected shape, cutting a series of V-shaped slots at pre-selected intervals along the peripheral edge of said panel with the apexes of said slots extending inwardly towards the center portion of said panel, deforming said panel under an exteriorly applied stress to a preselected contour wherein the edges defining each of said slots are disposed in aligned contiguous relationship, securing the opposed slot-defining edges together while maintaining said panel in the deformed condition, releasing the exteriorly applied stress on said panel which is retained in the contoured condition by the residual stress in said panel and the securing of said opposed slot-defining edges together, and thereafter applying a decorative face coating on the concave face of the deformed said panel.

2. The method of making an integral prestressed and preshaped vehicle headliner which comprises the steps of providing a substantially flat panel of a resilient material, cutting said panel to a preselected shape, cutting a series of V-shaped slots at preselected intervals along the peripheral edge of said panel with the apexes of said slots extending inwardly toward the center portion of said panel, positioning a stretchable facing sheet over one surface of said panel and interposing an adhesive between said panel and said facing sheet, concurrently deforming said panel and said facing sheet under an exteriorly applied stress to a preselected contour wherein the edges defining each of said slots are disposed in aligned contiguous relationship and adhesively securing said facing sheet to said panel, securing the opposed slot-defining edges together while maintaining said panel in the deformed condition, and thereafter releasing the exteriorly applied stress on said panel and said facing sheet adhesively secured to the concave surface of said panel.

3. The method of making an integral prestressed and preshaped vehicle headliner which comprises the steps of providing a substantially flat resilient hard board panel, cutting said panel to a preselected shape, cutting a series of V-shaped slots at preselected intervals along the peripheral edge of said panel with the apexes of said slots extending inwardly towards the center portion of said panel, cutting a circular aperture through said panel at a location corresponding to each apex of each of said slots, deforming said panel under an exteriorly applied stress and stressing said panel below the yield point of said panel to a preselected contour wherein the edges defining each of said slots are disposed in aligned contiguous relationship, securing the opposed slot-defining edges together while maintaining said panel in the deformed condition, releasing the exteriorly applied stress on said panel without substantially reducing the internal stress thereof, and thereafter applying a decorative face coating on the concave face of the contoured said panel.

4. The method of making an integral prestressed and preshaped vehicle headliner which comprises the steps of providing a substantially flat resilient hard board panel, cutting said panel to a preselected shape, cutting a series of V-shaped slots at predetermined intervals along the peripheral edge of said panel with the apexes of said slots extending inwardly towards the center portion of said panel, cutting an aperture through said panel at a location corresponding to each apex of each of said slots, positioning a stretchable facing material over one face surface of said panel and interposing an adhesive between said facing material and said panel, deforming said panel and said facing sheet under an exteriorly applied stress and stressing said panel below the yield point of said panel to a preselected contour wherein the side edges defining each of said slots are disposed in aligned contiguous relationship, securing the opposed slot-defining edges together while maintaining said panel and said facing sheet in the deformed and stressed condition, and thereafter releasing the exteriorly applied stress on said panel forming a composite headliner of a preselected contour having said facing sheet adhesively secured to the concave surface thereof.

References Cited by the Examiner

UNITED STATES PATENTS

| | | | |
|---|---|---|---|
| 2,420,522 | 5/1947 | Le Grand Daly | 156—211 |
| 2,674,488 | 4/1954 | Lyijynen et al. | |
| 2,768,026 | 10/1956 | Stephens et al. | |
| 3,001,901 | 9/1961 | Barkley | 156—222 |
| 3,105,787 | 10/1963 | Carpenter et al. | 156—222 |

FOREIGN PATENTS 545,489  11/1941  Great Britain.

MORRIS SUSSMAN, *Primary Examiner.*

A. HARRY LEVY, *Examiner.*

W. J. VAN BALEN, C. C. PARSONS,
*Assistant Examiners.*